US009622206B1

United States Patent
Malhotra et al.

(10) Patent No.: US 9,622,206 B1
(45) Date of Patent: *Apr. 11, 2017

(54) REGISTRATION WITH RADIO ACCESS NETWORK IN RESPONSE TO REGISTRATION WITH CALL SERVER

(71) Applicant: Sprint Spectrum L.P., Overland Park, KS (US)

(72) Inventors: Rajil Malhotra, Olathe, KS (US); Deveshkumar Rai, Overland Park, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,440

(22) Filed: Oct. 7, 2015

Related U.S. Application Data

(63) Continuation of application No. 14/201,292, filed on Mar. 7, 2014, now Pat. No. 9,179,433.

(51) Int. Cl.
| | |
|---|---|
| *H04W 4/00* | (2009.01) |
| *H04W 60/00* | (2009.01) |
| *H04W 76/02* | (2009.01) |
| *H04W 36/34* | (2009.01) |

(52) U.S. Cl.
CPC ......... *H04W 60/005* (2013.01); *H04W 36/34* (2013.01); *H04W 76/026* (2013.01)

(58) Field of Classification Search
None
See application file for complete search history.

(56) References Cited

U.S. PATENT DOCUMENTS

| 7,487,199 B2 * | 2/2009 | Idnani | H04L 29/06027 370/338 |
|---|---|---|---|
| 9,344,877 B1 * | 5/2016 | Arugonda | H04W 8/20 |
| 2006/0286984 A1 | 12/2006 | Bonner | |
| 2008/0119243 A1 * | 5/2008 | Matsumoto | H04W 52/0274 455/574 |
| 2010/0077459 A1 * | 3/2010 | Mahdi | H04W 36/0022 726/4 |
| 2011/0188446 A1 * | 8/2011 | Bienas | H04W 74/00 370/328 |

(Continued)

FOREIGN PATENT DOCUMENTS

FR EP 1843614 A1 * 10/2007 ....... H04L 29/06027

*Primary Examiner* — German J Viana Di Prisco

(57) ABSTRACT

A method and apparatus in which (i) a user equipment device registers with a first radio access network (RAN) that provides connectivity with a transport network, (ii) once registered with the first RAN, the device then registers via the first RAN and transport network with a call server, and (iii) in response to the device registering with the call server, but before the device then engages in a call served by the call server, the device registers via the first RAN with a second RAN. The method may thereby help to expedite later handover of a call served by the call server from being via the first RAN to being via the second RAN. Further, by the second RAN registration being conducted in response to registration of the device with the call server, the method may help to ensure usefulness of the registration of the device with the second RAN.

20 Claims, 5 Drawing Sheets

(56) References Cited

U.S. PATENT DOCUMENTS

| | | | |
|---|---|---|---|
| 2011/0270967 A1* | 11/2011 | Qiu | H04L 43/0882 709/224 |
| 2012/0115489 A1 | 5/2012 | Shuai et al. | |
| 2012/0246255 A1* | 9/2012 | Walker | H04W 60/005 709/208 |
| 2013/0301466 A1 | 11/2013 | Nenner | |

* cited by examiner

REGISTRATION WITH RADIO ACCESS NETWORK IN RESPONSE TO REGISTRATION WITH CALL SERVER

REFERENCE TO RELATED APPLICATION

This is a continuation of U.S. patent application Ser. No. 14/201,292, filed Mar. 7, 2014, the entirety of which is hereby incorporated herein by reference.

BACKGROUND

Unless otherwise indicated herein, the materials described in this section are not prior art to the claims and are not admitted to be prior art by inclusion in this section.

A typical radio access wireless (RAN) network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the RAN.

In general, a RAN may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures initiation of communications, handover between coverage areas, and functions related to air interface communication.

In order to receive certain services of a RAN, such as to place and receive calls via the RAN or to engage in data communication via the RAN, a UE may need to first register with the RAN. Procedures for RAN registration of a UE may vary from network to network, depending on the air interface protocol and other factors. But typically, RAN registration involves an exchange of signaling between the UE and the RAN, and the RAN responsively engaging in various processes to authorize and authenticate the UE, to establish a local service record for the UE, and to record where the UE is located (such as which base station or coverage area will be serving the UE).

Once a UE is registered with a RAN and operating within coverage of a particular base station, the UE may then operate in an idle mode or a connected (or active) mode. In the idle mode, the UE may periodically monitor air interface communications from the base station to receive system overhead information (e.g., operational parameters) and to check for any page messages destined to the UE. Upon receipt of a page message, or when the UE seeks to engage in a call or other communication, the UE may then engage in control signaling with the base station and may transition into a connected mode, with the base station assigning for the UE certain air interface resources that the UE can use to engage in bearer communication (e.g., communication of voice or other user/application data), and the UE may then engage in bearer communication accordingly. In turn, once the UE finishes the bearer communication, perhaps after a threshold period of absence of such communication, the UE may then revert to operating in the idle mode.

OVERVIEW

In some areas, service providers may provide multiple RANs, each of which may be arranged as described above, including a number of base stations that provide coverage, and associated network infrastructure that provides connectivity with one or more transport network such as the PSTN and/or the Internet. In such an area, when a UE is served by one RAN and is engaged in a communication via that RAN, if the UE begins to lose coverage of the RAN and the UE detects sufficient coverage of another RAN, the UE may engage in an inter-RAN handover process by which the UE transitions to be served instead by the other RAN and to continue engaging in the communication via that other RAN.

To facilitate such handover, it may be necessary for the UE to register with the new RAN as described. In particular, before the UE transitions to be served by the new RAN, the UE may need to engage in registration signaling with the new RAN, and the new RAN may need to engage in various processes to authorize and authenticate the UE, to establish a local service record for the UE, and to record where the UE is located. Unfortunately, however, this process of a UE registering with the new RAN may take time and may therefore slow down the handover process.

A particular example of this timing issue may arise in a scenario where a UE is registered with and served by a first RAN, and through the first RAN the UE registers to be served by a call server such as an Internet Protocol (IP) Multimedia System (IMS) platform and the UE then engages, via the first RAN, in a call served by the call server. During such a call, if the UE begins to lose coverage of the first RAN and detects sufficient coverage of a second RAN, the UE may hand over from being served by the first RAN to being served instead by the second RAN, and the UE and/or second RAN may engage in signaling with the call server to facilitate connection of the UE's call via the second RAN, so that the UE can then continue the call via the second RAN. In this scenario, it may be desirable for the entire handover process to occur quickly, to minimize or avoid noticeable disruption of the UE's call. But before the UE can be served by the second RAN, the UE may need to first register with the second RAN, and that registration process may undesirably delay the handover process.

One way to help address this issue is to have a UE engage in a pre-registration process with the second RAN before the UE encounters a need to hand over to the second RAN. For instance, once the UE registers with the first RAN, the UE could then pre-register with the second RAN before the UE engages in a communication served by the first RAN. (Depending on the relationship between the RANs and other factors, this pre-registration with the second RAN could involve the UE and second RAN exchanging registration signaling via the first RAN.) That way, if and when the UE is engaged in a communication via the first RAN and then begins to lose coverage of the first RAN and to detect sufficient coverage of the second RAN, the UE can more readily hand over to the second RAN, without the delay resulting from then registering with the second RAN.

In the example scenario described above, if a UE has registered with the first RAN and would then register via the first RAN with a call server so that the UE may then engage in a call served by the call server, the issue that may arise as noted above is a delay in handover of such a call from being conducted via the first RAN to being conducted via the second RAN. Applying the above solution in this scenario, once the UE registers with the first RAN, the UE could then pre-register with the second RAN before the UE engages in call served by the call server, and thus before a need arises to hand over such a call from being conducted via the first RAN to being conducted via the second RAN. Yet such a handover may ultimately never occur if the UE does not first register with the call server and engage in a call served by the call server. Consequently, if the UE pre-registers with the second RAN but does not successfully register with the call server, the process of pre-registering with the second RAN may be of no value.

Disclosed herein is a method and apparatus to help more efficiently manage registration in a scenario such as that described above. In accordance with the disclosure, once a UE registers with a first RAN that provides connectivity with a transport network, the UE may then register via the first RAN and transport network with a call server. In turn, in response to the UE registering with the call server (i.e., using such successful registration as a trigger), but before the UE then engages in a call served by the call server, the UE registers via the first RAN with a second RAN.

In practice, for instance, the call server may be a voice over Internet Protocol (VoIP) call server, such as an IMS call server for instance, which may be accessible via a packet-switched network to which both the first RAN and second RAN provide connectivity. Once the UE registers with and is served by the first RAN, the UE may then engage in Session Initiation Protocol (SIP) signaling with the call server via the first RAN and the packet-switched network, to register with the call server. And in response to the UE receiving from the call server a SIP message that confirms successful registration with the call server, but before the UE then engages in any call served by the call server, the UE may then proceed to register with the second RAN via the first RAN, such as via an interface between the two RANs. Thereafter, the UE may then begin to engage, via the first RAN and the packet-switched network, in a call served by the call server. And while engaged in that call, the UE may hand over from engaging in the call via the first RAN to engaging in the call via the second RAN.

Advantageously in this process, the fact that the UE registered with the second RAN before beginning to engage in the call served by the call server may avoid a need for the UE to engage in such registration at the time of the handover. Further, the fact that the UE registered with the second RAN in response to the UE successfully registering with the call server, rather than merely in response to the UE having registered with the first RAN, may help ensure that the UE's registration with the second RAN can be of value specifically with respect to a call served by the call server.

Accordingly, disclosed herein is a method operable by a UE. According to the method, the UE registers with a first RAN. And once the UE is thereby registered with the first RAN, the UE registers via the first RAN with a call server that is configured to serve calls, so as to establish a registration of the UE with the call server. In response to the UE registering with the call server, but before the UE then engages in any calls served by the call server based on the registration with the call server, the UE then registers, via the first RAN, with a second RAN, so as to establish a registration of the UE with the second RAN.

Once the UE is thereby registered with the first RAN, with the call server, and with the second RAN, the UE then begins to engage via the first RAN in a call served by the call server. And while engaged in the call, the UE hands over from engaging in the call via the first RAN to engaging in the call via the second RAN. Advantageously in this process, the handover of the UE to engaging in the call via the second RAN is based on the earlier registration of the UE with the second RAN, thereby helping to avoid a need for the UE to register with the second RAN at the time of engaging in the handover, and consequently helping to expedite the handover.

Further, disclosed herein is a device that includes a wireless communication interface and a controller that is configured to (i) register the device, via a first RAN serving the device, with a call server and (ii) in response to registering the device with the call server, but before the device then engages in any calls served by the call server, register the device, via the first RAN, with a second RAN. In such a device, the act of registering the device with the call server may involve transmitting via the wireless communication interface to the call server a registration request message and receiving via the wireless communication interface from the call server, in response to the registration request message, a registration response message indicating successful registration of the device with the call server. And the act of registering the device with the second RAN in response to registering the device with the call server may involve registering by the device with the second RAN in response to the indication of successful registration of the device with the call server.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
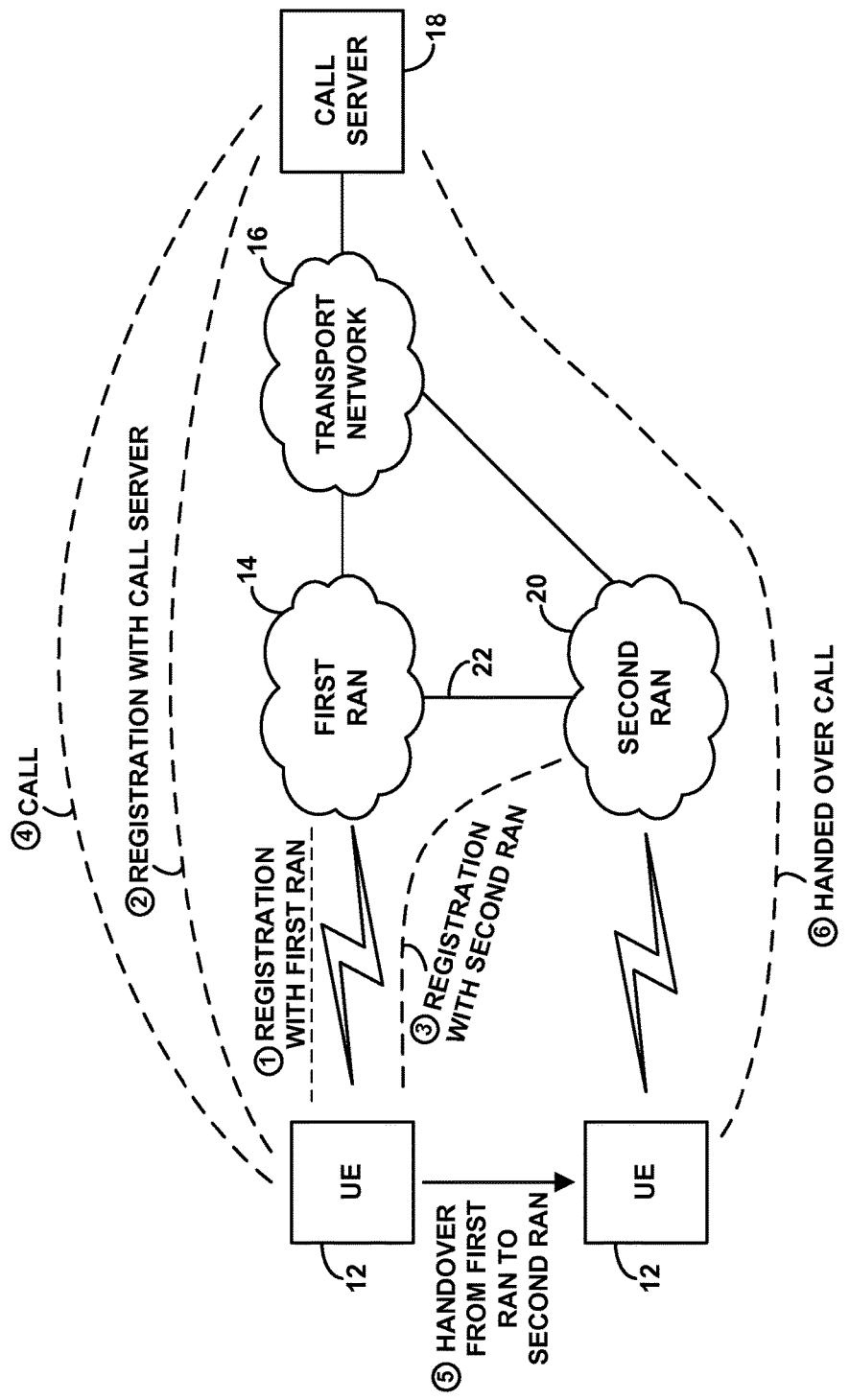
FIG. 1 is a simplified block diagram of a network arrangement in which aspects of the present disclosure can be implemented, further depicting representative functions.

Referring to the drawings, as noted above, FIG. 1 is a simplified block diagram depicting an example network arrangement in which the present method can be implemented, and depicting functions of the present method. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

As shown in FIG. 1, the example arrangement includes a UE 12 within coverage of a first RAN 14, the first RAN 14 providing connectivity with a transport network 16, and a call server 18 being accessible via the transport network. Further, the arrangement includes a second RAN 20 that also provides connectivity with the transport network 16, and an interface 22 that connects the first RAN with the second RAN.

In this example arrangement, when the UE first powers on in coverage of the first RAN or otherwise enters into coverage of the first RAN, the UE may detect a pilot or reference signal broadcast from the first RAN and may responsively register with the first RAN, as shown at step 1. As discussed above, this process of registering with the first RAN may involve the UE transmitting a registration request message to the first RAN, and the first RAN responsively carrying out various functions such as authorizing and authenticating the UE, storing a local service record for the UE, and noting the coverage area where the UE is operating. Further, the process may conclude with the first RAN transmitting to the UE a registration response message that confirms completion and success of the process of the UE registering with the first RAN.

As shown next at step 2, once the UE is registered with the first RAN, the UE may then register via the first RAN and transport network 16 with the call server 18, based on the UE's registration with the first RAN. In particular, the UE may enter into a connected mode of service with the first RAN, which the first RAN would allow on grounds that the UE is registered with the first RAN, and in the connected mode the UE may then engage in communication on the transport network to exchange registration signaling with the call server. By way of example, if the call server is a VoIP call server, such as an IMS platform, and the transport network is a packet-switched network, this registration process may involve the UE engaging in application layer SIP signaling with the call server, such as sending a SIP REGISTER message via the first RAN and transport network to the call server, and receiving in response from the call server a SIP 200 OK message confirming completion and success of the process of the UE registering with the call server.

In accordance with the present method, the UE may then respond to its successful registration with the call server by pre-registering with the second RAN, as shown at step 3. In particular, the UE may wait until the UE receives from the call server a response message (such as a SIP 200 OK) indicating completion and success of the UE's registration with the call server, and once the UE receives that response message, the UE may then responsively engage in a process to register with the second RAN via the UE's connection with the first RAN. Further, the UE would optimally engage in this registration with the second RAN before the UE engages in any call served by the call server based on the UE's registration with the call server. That is, once the UE has registered with the call server, but before the UE then engages in a call that the call server serves on grounds that the UE has that registration with the call server, the UE will register via the first RAN with the second RAN.

This step of the UE registering via the first RAN with the second RAN may involve an exchange of signaling between the UE and the second RAN via the first RAN, and the second RAN carrying out various registration functions as noted above. For instance, the UE may transmit over the air to the first RAN a registration request message of a type that the first RAN would forward to the second RAN, and the first RAN may then pass that registration request message over the interface 22 to the second RAN. The second RAN may then responsively carry out registration functions such as authorizing and authenticating the UE, storing a local service record for the UE, and noting the coverage area where the UE is operating (e.g., noting that the UE is currently served by the first RAN). Further, the process may conclude with the second RAN transmitting to the UE, via the first RAN, a registration response message that confirms completion and success of the process of the UE registering with the second RAN.

Once the UE is thereby registered with the first RAN, with the call server, and with the second RAN, the UE may then at some point begin to engage, via the first RAN, in a call served by the call server, as shown at step 4. Again considering the example where the call server is a VoIP call server such as an IMS platform, this process may involve the UE engaging in SIP signaling to establish a Real-time Transport Protocol (RTP) session with a node of the call server and the call server bridging that session with a remote call party (not shown). For instance, the UE may place an outgoing call by transmitting via the first RAN and transport network to the call server a SIP INVITE message designating a called party number or SIP address, the UE may receive in response from the call server a SIP 200 OK, and the UE may then transmit to the call server a SIP ACK to complete setup of the RTP session. Likewise, the UE may receive an incoming call by receiving from the call server a SIP INVITE, transmitting to the call server a SIP 200 OK, and receiving from the call server a SIP ACK.

As shown next at step 5 in the figure, while the UE is engaged, via the first RAN, in the call served by the call server, the UE may then engage in a process to hand over from being served by the first RAN to being served instead by the second RAN. In practice, for instance, the UE may detect threshold poor signal strength from the first RAN (including perhaps a lack of sufficiently strong other first RAN coverage to which the UE could hand over) and sufficiently strong signal strength from the second RAN, and the UE may responsively hand over to the second RAN, perhaps engaging in signaling with the first RAN to authorize and/or trigger the handover.

In practice, the second RAN may require the UE to be registered with the second RAN before the second RAN will serve the UE. Advantageously with the present method, however, the UE would already be registered with the second RAN as discussed above, so there may be no need for the UE to engage in a process of registering with the second RAN at the time of this handover. Rather, the second RAN may simply begin to serve the UE on grounds that the UE is already registered with the second RAN.

The process of the UE handing over to the second RAN may involve handover signaling passing between the first RAN and the second RAN and the UE then transitioning to communicate directly over the air with the second RAN, or the process may take other forms, such as the UE transitioning to communicate directly with the second RAN without handover signaling passing between the first RAN and second RAN. Further, as part of the handover process, the second RAN may engage in signaling via the transport network with the call server to cause the call server to extend the UE's call to the second RAN, or the UE may engage in signaling via the second RAN and transport network with the call server to facilitate extension of the call to be via the second RAN. Through these or other processes, the UE may then continue to engage in the call served by the call server, via the second RAN, as shown at step 6.

Figure 2:
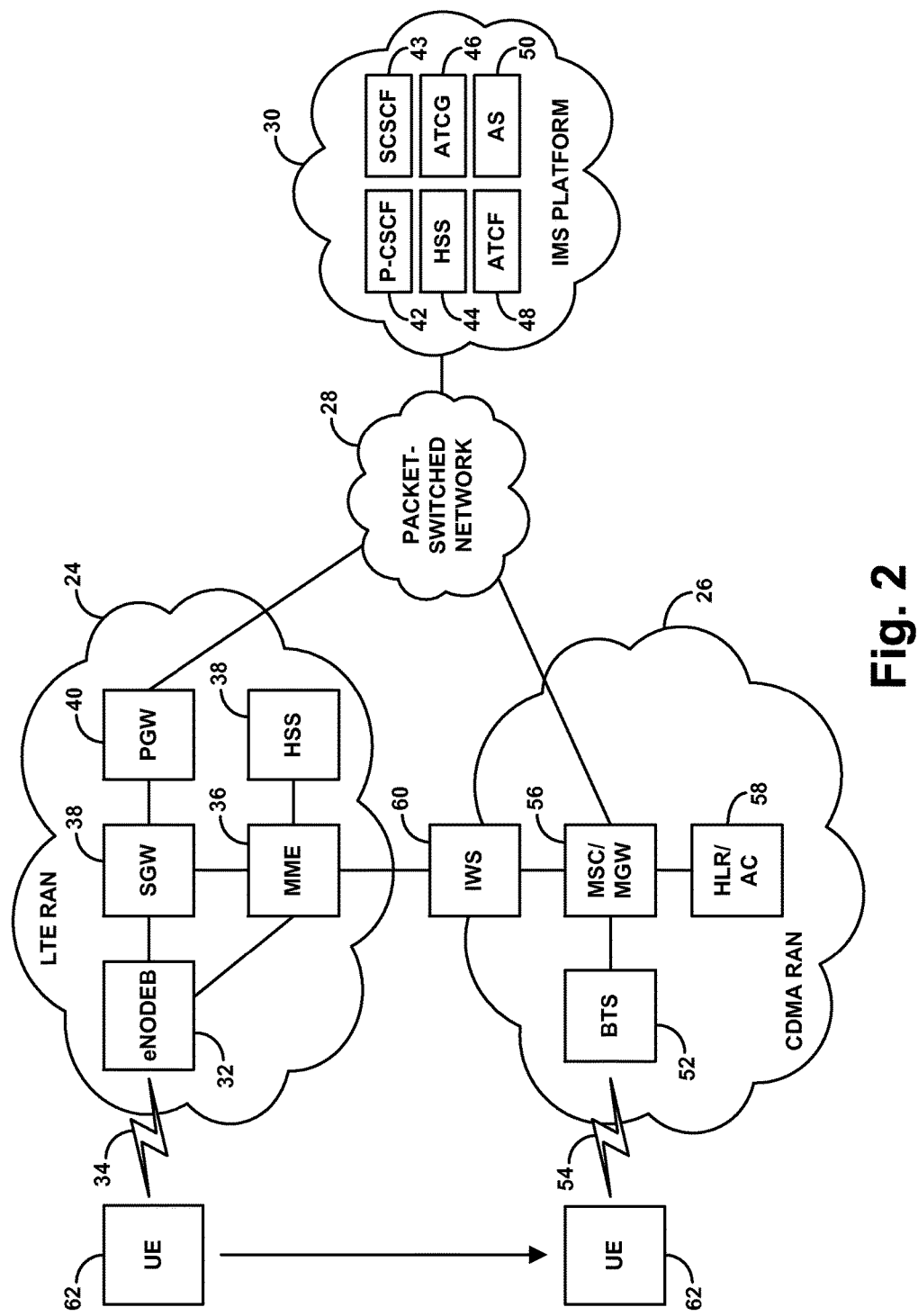
FIG. 2 is another simplified block diagram of a network arrangement in which aspects of the disclosure can be implemented.

FIG. 2 is next a more specific, but still simplified, block diagram to help illustrate how this process can work in an example arrangement where the first RAN is an LTE RAN 24, the second RAN is a CDMA RAN 26, the transport network is a packet-switched network 28, and the call server is an IMS platform 30. It will be understood, however, that principles of this disclosure can extend to other air interface protocols and other network arrangements as well, with variations where appropriate. (For example, without limitation, the second RAN could be a GSM RAN.) Further, even within the context of this specific arrangement, numerous variations are possible.

In the arrangement of FIG. 2, the LTE RAN 24 primarily serves UEs with wireless packet data communication service, including for instance VoLTE service. Whereas the CDMA RAN 26 primarily serves UEs with wireless circuit-switched voice call service (but may also provide packet-data communication service and other types of service). These RANs may be owned or operated by a common wireless service provider, which may enable the provider to serve UEs with high speed packet data service through the LTE RAN and traditional cellular voice call service through the CDMA RAN.

The LTE RAN 24 in the example system is shown including a representative LTE base station 32 known as an eNodeB, which includes an antenna structure and associated equipment for providing an LTE coverage area 34 in which UEs can be served by the eNodeB and thus by the LTE RAN. The eNodeB is then shown having a communication interface with a mobility management entity (MME) 36 that functions as a signaling controller for the LTE RAN. Further, the eNodeB is also shown having a communication interface with a serving gateway (SGW) 38, which is in turn shown having a communication interface with a packet-data network gateway (PGW) 40 that provides connectivity with the packet-switched network 28, and the MME is shown having a communication interface with the SGW. Moreover, the MME is shown having a communication interface with a home subscriber server (HSS) 38, which may store service profiles for UEs and may function to facilitate authorization, authentication, and other such functions. In practice, the illustrated components of the LTE RAN may sit as nodes on a private packet-switched network (perhaps network 28 if network 28 is such a network) owned by an operator of the LTE RAN, and thus the various communication interfaces may be virtual interfaces through that network.

IMS platform 30 is then illustrated as a network or combination of nodes accessible via the packet-switched network 28. Depicted as example nodes within the example IMS platform are then a proxy call session control function (P-CSCF) 42, a serving CSCF (S-CSCF) 43, an HSS 44, and an access transfer control gateway (ATCG) 46, an access transfer control function (ATCF) 48, and an application server (AS) 50. The P-CSCF and S-CSCF may function generally to process and route SIP signaling, such as registration signaling and call setup signaling, and the HSS, like that described above, may store service profiles for UEs and may function to facilitate authorization, authentication, and other such functions. The ATCG may function as a bridge for transfer of sessions between access networks, and the ATCF may function as a controller for such bridging. And the AS may function to host and execute various services, including for instance voice call continuity services.

The CDMA RAN 26 is then shown including a representative CDMA base station 52 known as a base transceiver station (BTS), which includes an antenna structure and associated equipment for providing a CDMA coverage area 54 in which UEs can be served by the BTS and thus by the CDMA RAN. And the BTS is shown in communication (possibly through a base station controller (BSC) (not shown)) with a mobile switching center/media gateway (MSC/MGW) 56 that provides connectivity with the PSTN (not shown) and further with the packet-switched network 28. In addition, the example CDMA network includes a home location register/authentication center (HLR/AC) 58, which may store service profiles for UEs and may function to facilitate authorization, authentication, and other such functions.

Further shown in FIG. 2 is then an interworking server (IWS) 60, which serves as a signaling intermediary between the LTE RAN and the CDMA RAN to facilitate exchange of signaling between the RANs, such as to facilitate registration of a UE with the CDMA RAN via the LTE RAN and to facilitate handover signaling between the RANs. The IWS may be provided as an element of either one of the RANs or as an element separate from but connected to each RAN. For instance, the IWS may be integrated with the MSC/MGW 56 of the CDMA RAN and may have a communication interface with the MME 36 of the LTE RAN.

FIG. 2 illustrates a representative UE 62 located within coverage area 34 of the LTE RAN but moving into coverage area 54 of the CDMA RAN (or otherwise beginning to lose LTE coverage and perhaps responsively to detect sufficient CDMA coverage). In the example arrangement, this representative UE is a hybrid telephony device (e.g., cell phone or other such device), equipped to support both LTE service and CDMA service and is thus capable of being served by both the LTE RAN and the CDMA RAN and engaging in voice calls served the LTE RAN and voice calls served by the CDMA RAN. In practice, the UE may prioritize being served by the LTE RAN over being served by the CDMA RAN. Thus, if the UE detects sufficient coverage of both RANs, the UE may opt to be served by the LTE RAN.

In practice, when the UE enters into coverage of the LTE RAN, the UE may register with the LTE RAN by engaging in an LTE registration, or "attachment," process. In particular, the UE may transmit an attach request to the eNodeB, and the eNodeB may forward the attach request to the MME. The MME may then engage in signaling with the HSS and perhaps further signaling with the UE, to authorize and authenticate the UE, and may obtain from the HSS various service profile information for the UE for storage as a local context record for the UE at the MME, the eNodeB, and/or other LTE network elements. Moreover, the MME may engage in signaling with the SGW and the eNodeB, and the SGW may engage in signaling with the PGW, to facilitate reservation of resources to define one or more bearers as virtual tunnels through which the UE could then communicate with the PGW and thus with entities on the packet-switched network 28. And the MME may then transmit to the eNodeB an "attach accept" message, which the eNodeB may forward to the UE as an indication of completion and success of the UE's registration with the LTE RAN.

Once registered with the LTE RAN, the UE may then register with the IMS platform. In particular, the UE may transmit to the P-CSCF 40, via a bearer through the LTE RAN and via the packet-switched network 28, a SIP REGISTER message, which the P-CSCF may forward to the HSS 44. The HSS may then authorize and authenticate the UE to be served by the IMS platform and may establish a record of the UE's registration with the IMS platform, and the HSS may signal to the C-CSCF 42, which may send a SIP 200 OK to the UE via the P-CSCF, the packet-switched network, and the LTE bearer. The UE's receipt of this this SIP 200 OK may function as an indication to the UE that the UE is now registered with the IMS platform, so that the UE may then work with the IMS platform to set up and engage in VoIP calls and other such services.

To facilitate possible handover of such a subsequent call from being conducted via the LTE RAN to being conducted via the CDMA RAN, the IMS platform may also engage in signaling with the LTE RAN in response to or as part of the UE's registration with the IMS platform. In particular, the ATCF may send to the AS a unique identifier of the ATCF (e.g., a 10-digit session transfer number, STN-SR) that may function as a bridging anchor point of the IMS platform, and the AS may forward at ATCF identifier to the HSS, and the HSS may forward the identifier to the MME. That way, the MME can later provide that ATCF identifier via the IWS to the MSC/MGW to enable the MSC to engage in signaling with the ATCF to trigger bridging of the call over to the CDMA RAN. Further, the IMS platform may include the same ATCF identifier in the SIP 200 OK that the IMS platform sends to the UE in response to the UE's SIP REGISTER message, to facilitate later processing of such a handover. Thus, the SIP 200 OK that the UE receives from the IMS platform may carry that specification of the IMS platform anchor point.

In line with the discussion above, the UE may respond to its registration with the IMS platform by then pre-registering via the LTE RAN with the CDMA RAN, before the UE engages in any call served by the IMS platform based on the UE's registration with the IMS platform. In particular, because the UE receives a message indicating successful registration of the UE with the IMS platform (e.g., as opposed to receiving a rejection of the UE's request to register with the IMS platform), the UE may the engage in registration signaling with the second RAN via the UE's connection with the first RAN.

This registration signaling may involve the UE transmitting via the first RAN to the second RAN one or more signaling messages carrying data that the second RAN will use for registering the UE to be served by the second RAN. For instance, the UE may transmit to eNodeB 32 a CDMA registration request message (e.g., an Uplink Handover Preparation Transfer message) that carries various information such as identifiers of the UE. Further, the UE may include in this or another signaling message the STN-SR noted above, and a value indicating that the registration is to facilitate possible later handover of an LTE-based VoIP call to the CDMA RAN. (An example of such a value is a generic circuit services notification application (GSCSN) for single radio voice call continuity (SRVCC). Other examples may be possible as well.) The eNodeB may then forward each such signaling message to the MME, and the MME may forward each such signaling message via the IWS to the MSC/MGW.

Upon receipt of the UE's registration request message, the MSC may then engage in signaling with the HLR/AC, and perhaps further signaling over a similar path with the UE, to authorize and authenticate the UE to be served by the CDMA RAN, and to obtain and store a local service profile record for the UE. Further, the MSC/MGW may then transmit to the UE, via a similar path through the LTE RAN, a registration response message that indicates the UE is registered with the CDMA RAN.

At some point after the UE is thus registered with the LTE RAN, with the IMS platform, and with the CDMA RAN, the UE may then set up and engage, via the LTE RAN, in VoIP call served by the IMS platform. In particular, the UE may engage in SIP signaling via an LTE bearer as discussed above to set up such a call and may then engage in the call via an LTE bearer.

While engaged in this VoIP call, the UE may then begin to detect poor LTE coverage, such as LTE signal strength lower than a defined threshold level for instance, and, at the direction of the LTE network, the UE may then evaluate CDMA coverage at the UE's location. The UE may then transmit to the eNodeB a CDMA measurement report, which the eNodeB may forward to the MME, and the MME may forward via the IWS to the MSC/MGW. The UE may include with this measurement report, or in a separate message to the CDMA RAN, the STN-SR that the UE received earlier, as an alternative way to convey that information to the MSC/MGW.

Upon receipt of this measurement report and perhaps other signaling with the UE and/or the LTE RAN, the MSC/MGW may then prepare for handover of the UE's call. In particular, the MSC/MGW may cause the BTS 52 to assign a CDMA air interface traffic channel for use by the UE to engage in the call, and the MSC/MGW may transmit via the LTE RAN to the UE a channel assignment message indicating the assigned CDMA traffic channel. Further, the MSC/MGW may work with the IMS platform to facilitate bridging of the UE's call over to the CDMA RAN. In particular, the MSC/MGW may send a SIP INVITE to the ATCF indicated by the STN-SR, and the ATCF may signal with the ATCG to invoke bridging of the existing VoIP call via an RTP leg to the MSC/MGW. Thus, the UE may then transition to engage in the call over the assigned CDMA traffic channel. And the MSC/MGW may then signal to the ATCF to cause teardown of the earlier connection of the call via the LTE RAN.

In general, when a UE is engaged in a VoIP call via an LTE RAN and the UE hands over to be served instead by a CDMA RAN, it may be desirable for the handover process to occur quickly, such as within 300 milliseconds. If the UE engages in registration with the CDMA RAN at the time this handover is going to occur, that CDMA registration process may take a relatively great extent of this time, such as 100-150 milliseconds. By having the UE register with the CDMA RAN in response to the UE's registration with the IMS platform, before the UE even engages in a call that may then be handed over to the CDMA RAN, this overall handover process may advantageously occur as quickly as desired.

Figure 3:
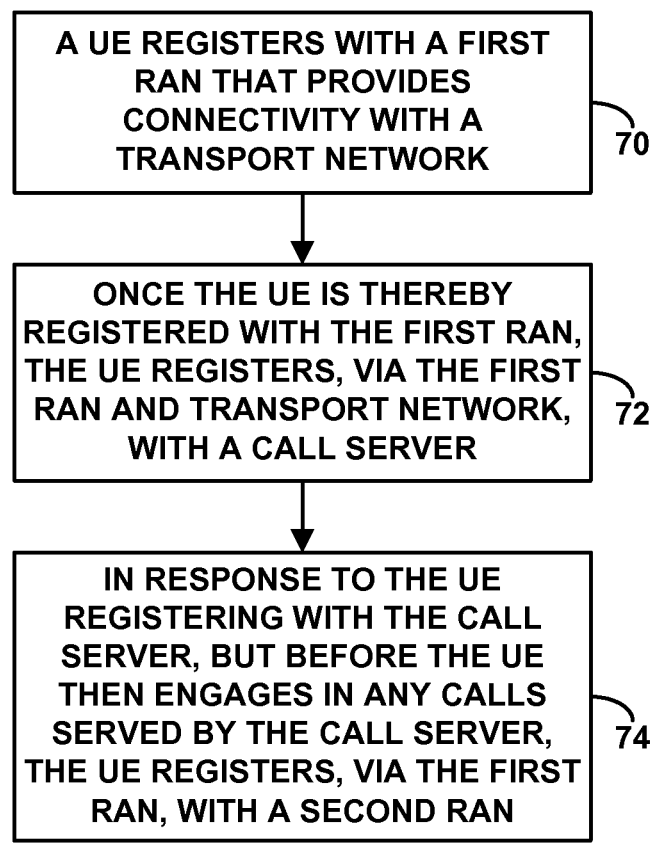
FIG. 3 is a flow chart depicting functions that can be carried out in accordance with the disclosure.

FIG. 3 is next a flow chart depicting functions that can be carried out in accordance with the present disclosure. As shown in FIG. 3, at block 70, a UE registers with a first RAN that provides connectivity with a transport network. In turn, at block 72, once the UE is thereby registered with the first RAN, the UE registers, via the first RAN and transport network, with a call server. And at block 74, in response to the UE registering with the call server, but before the UE then engages in any calls served by the call server, the UE registers, via the first RAN, with a second RAN.

Figure 4:
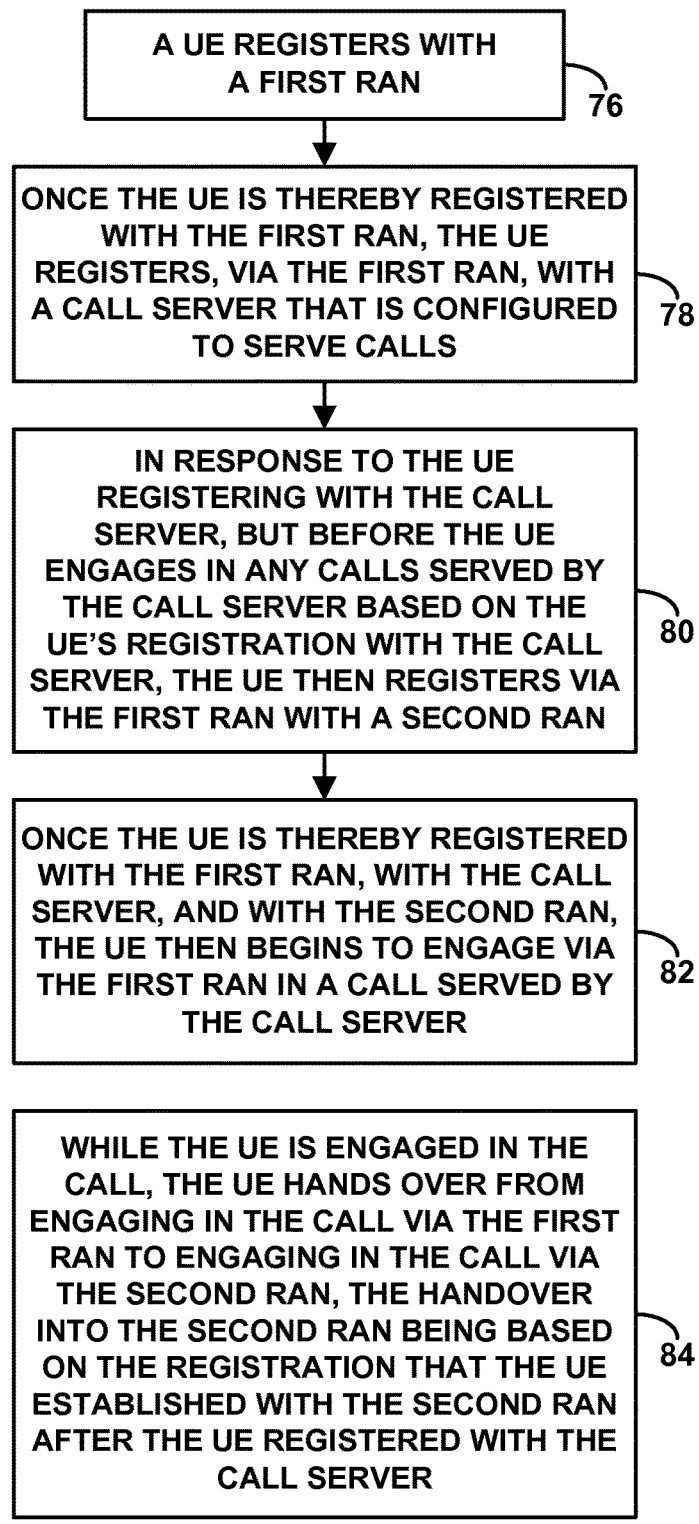
FIG. 4 is another flow chart depicting functions that can be carried out in accordance with the disclosure.

FIG. 4 is next another flow chart depicting functions that can carried out in accordance with the present disclosure. As shown in FIG. 4, at block 76, a UE registers with a first RAN. At block 78, once the UE is thereby registered with the first RAN, the UE registers, via the first RAN, with a call server that is configured to serve calls, with that registering by the UE with the call server establishing a registration of the UE with the call server. At block 80, in response to the UE registering with the call server, but before the UE engages in any calls served by the call server based on that registration with the call server, the UE then registers via the first RAN with a second RAN, with that registering by the UE with the second RAN establishing a registration of the UE with the second RAN.

At block 82, once the UE is thereby registered with the first RAN, with the call server, and with the second RAN, the UE then begins to engage via the first RAN in a call served by the call server. And at block 84, while the UE is engaged in that call, the UE hands over from engaging in the call via the first RAN to engaging in the call via the second RAN. And advantageously with the present method, the handing over to engaging in the call via the second RAN is based on the registration that the UE earlier established with the second RAN after the UE registered with the call server, thereby avoiding a need for the UE to register with the second RAN at the time the UE engages in the handover to the second RAN, while allowing handover of the UE's call served by the call server.

Figure 5:
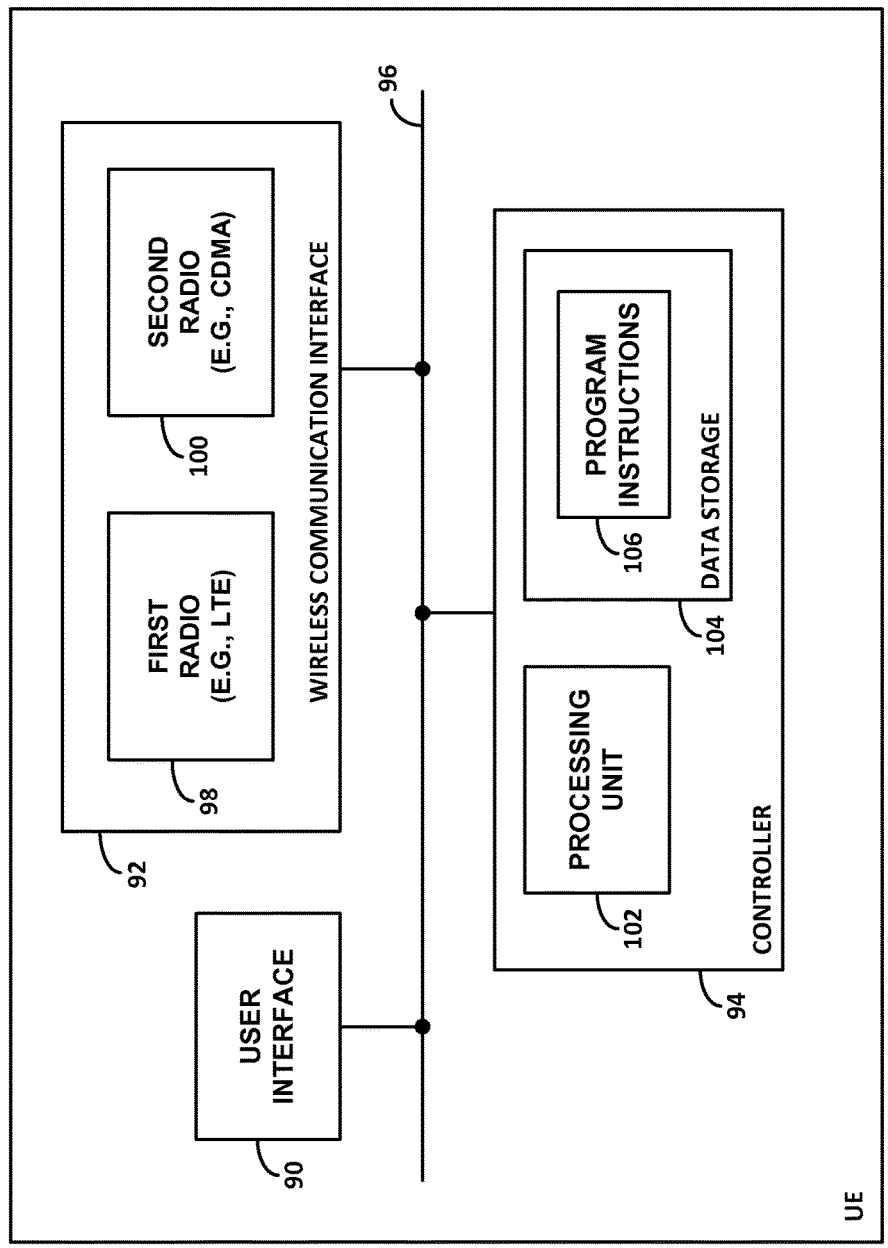
FIG. 5 is a simplified block diagram of an example UE operable in accordance with the disclosure.

Finally, FIG. 5 is a simplified block diagram of an example UE or other device, showing some of the components that such a device may include in order to carry out various aspects of the present method as described above. Without limitation, the example device may be a hybrid wireless communication device as described above, supporting both LTE service and CDMA service.

As shown in FIG. 5, the example device includes a user interface 90, a wireless communication interface 92, and a controller 94, all of which may be coupled together by a system bus, network, or other connection mechanism 96. In practice, the user interface 90 may include input and output components through which a user of the device can request initiation of voice calls and can engage in voice calls. Further, the wireless communication interface 92 may include one or more radios with associated antennas, such as a first radio 98 configured for the device to be served by a first RAN such as an LTE RAN, and a second radio 100 configured for the device to be served by a second RAN such as a CDMA RAN for instance.

Further, the controller 94 may take various forms, including various combinations of hardware, firmware, and/or software (e.g., a processing unit 102, non-transitory data storage 104, and program instructions 106 stored in the data storage and executable by the processing unit), to cause the device to carry out various functions described herein, and may be integrated with one or more other UE components. In practice, for instance, the controller may be programmed (i) to register the device (i.e., cause the device to register), via a first RAN serving the device, with a call server and (ii) in response to registering the device with the call server, but before the device then engages in any calls served by the call server, to register the device, via the first RAN, with a second RAN.

In line with the discussion above, the function of registering the device with the call server may involve transmitting via the wireless communication interface to the call server a registration request message and receiving via the wireless communication interface from the call server, in response to the registration request message, a registration response message indicating successful registration of the device with the call server. Further, the function of registering the device with the second RAN in response to registering the device with the call server may involve registering the device with the second RAN in response to the indicating of successful registration of the device with the call server.

Exemplary embodiments have been described above. Those skilled in the art will understand, however, that changes and modifications may be made to these embodiments without departing from the true scope and spirit of the invention.

We claim:

1. A method comprising:
   registering by a user equipment device (UE) with a first radio access network (RAN) that provides connectivity with a transport network;
   once the UE is thereby registered with the first RAN, registering by the UE, via the first RAN and transport network, with a call server; and
   in response to registering by the UE with the call server, but before the UE then engages in any calls served by the call server, registering by the UE, via the first RAN, with a second RAN,
   wherein registering by the UE via the first RAN with the second RAN in response to registering by the UE with the call server comprises, in response to registering by the UE with the call server, transmitting by the UE wirelessly to the first RAN a second-RAN registration request message for forwarding by the first RAN to the second RAN.

2. The method of claim 1,
   wherein registering by the UE with the call server comprises transmitting by the UE to the call server a call-server registration request message and receiving by the UE from the call server, in response to the call-server registration request message, a registration response message indicating successful registration of the UE with the call server, and
   wherein registering by the UE with the second RAN in response to registering by the UE with the call server comprises registering by the UE with the second RAN in response to the indicating of successful registration of the UE with the call server.

3. The method of claim 2, wherein registering by the UE, via the first RAN and transport network, with the call server comprises transmitting by the UE the call-server registration request message via the first RAN and transport network to the call server and receiving by the UE the registration response message via the first RAN and transport network from the call server.

4. The method of claim 3, wherein the call server is a voice over Internet Protocol (VoIP) call server, and wherein registering with the call server comprises engaging in Session Initiation Protocol (SIP) registration with the call server.

5. The method of claim 1, further comprising:
   after the UE has registered via the first RAN with the second RAN, beginning to engage by the UE, via the first RAN and transport network, in a call served by the call server; and
   while engaged in the call served by the call server, handing over by the UE from engaging in the call via the first RAN to engaging in the call via the second RAN, wherein the registering by the UE with the second RAN before beginning to engage in the call avoids a need for the UE to register with the second RAN at a time of the handing over and thereby helps to expedite the handing over.

6. The method of claim 5, wherein the second-RAN registration request message carries data usable by the second RAN for registering the UE to be served by the second RAN.

7. The method of claim 6,
wherein registering with the call server comprises transmitting a Session Initiation Protocol (SIP) Register message to the call server and receiving from the call server a SIP 200 OK response indicating successful registration of the UE with the call server,
wherein the SIP 200 OK response carries a specification of an anchor point of the call server, and
wherein the method further comprises including by the UE, in the second-RAN registration request message that the UE transmits wirelessly to the first RAN for forwarding to the second RAN, the specification of the anchor point of the call server, for later use of the anchor point in processing the handing over of the UE to engaging in the call via the second RAN.

8. The method of claim 1, wherein the first RAN is a Long Term Evolution (LTE) RAN, and wherein the second RAN is selected from the group consisting of a Code Division Multiple Access (CDMA) RAN and a Global System for Mobile Communications (GSM) RAN.

9. A method comprising:
registering, by a user equipment device (UE), with a first radio access network (RAN);
once the UE is thereby registered with the first RAN, registering by the UE, via the first RAN, with a call server that is configured to serve calls, wherein the registering by the UE with the call server establishes a registration of the UE with the call server;
in response to the UE registering with the call server, but before the UE engages in any calls served by the call server based on the registration with the call server, registering by the UE, via the first RAN, with a second RAN, wherein registering by the UE via the first RAN with the second RAN in response to the UE registering with the call server comprises, in response to the UE registering with the call server, transmitting by the UE wirelessly to the first RAN a second-RAN registration request message for forwarding by the first RAN to the second RAN wherein the registering by the UE with the second RAN establishes a registration of the UE with the second RAN;
once the UE is thereby registered with the first RAN, with the call server, and with the second RAN, the UE beginning to engage via the first RAN in a call served by the call server; and
while engaged in the call, handing over by the UE from engaging in the call via the first RAN to engaging in the call via the second RAN, wherein the handing over to engaging in the call via the second RAN is based on the earlier registration of the UE with the second RAN, thereby avoiding a need for the UE to register with the second RAN when engaging in the handing over.

10. The method of claim 9,
wherein registering by the UE with the call server comprises transmitting by the UE to the call server a call-server registration request message and receiving by the UE from the call server, in response to the call-server registration request message, a registration response message indicating successful registration of the UE with the call server, and
wherein registering by the UE with the second RAN in response to registering by the UE with the call server comprises registering by the UE with the second RAN in response to the indicating of successful registration of the UE with the call server.

11. The method of claim 10, wherein registering by the UE, via the first RAN, with the call server comprises transmitting by the UE the call-server registration request message via the first RAN to the call server and receiving by the UE a response to the call-server registration request message via the first RAN from the call server.

12. The method of claim 11, wherein the call server is a voice over Internet Protocol (VoIP) call server, and wherein registering with the call server comprises engaging in Session Initiation Protocol (SIP) registration with the call server.

13. The method of claim 9, wherein the second-RAN registration request message carries data usable by the second RAN for registering the UE to be served by the second RAN.

14. The method of claim 13,
wherein registering with the call server comprises transmitting a Session Initiation Protocol (SIP) Register message to the call server and receiving from the call server a SIP 200 OK response indicating successful registration of the UE with the call server,
wherein the SIP 200 OK response carries a specification of an anchor point of the call server, and
wherein the method further comprises including by the UE, in the second-RAN registration request message that the UE transmits wirelessly to the first RAN for forwarding to the second RAN, the specification of the anchor point of the call server, for later use of the anchor point in processing the handing over of the UE to engaging in the call via the second RAN.

15. The method of claim 9, wherein the first RAN is a Long Term Evolution (LTE) RAN, and wherein the second RAN is selected from the group consisting of a Code Division Multiple Access (CDMA) RAN and a Global System for Mobile Communications (GSM) RAN.

16. A device comprising:
a wireless communication interface; and
a controller configured to (i) register the device, via a first radio access network (RAN) serving the device, with a call server and (ii) in response to registering the device with the call server, but before the device then engages in any calls served by the call server, register the device, via the first RAN, with a second RAN,
wherein registering the device with the call server comprises transmitting via the wireless communication interface to the call server a call-server registration request message and receiving via the wireless communication interface from the call server, in response to the call-server registration request message, a registration response message indicating successful registration of the device with the call server,
wherein registering the device via the first RAN with the second RAN comprises transmitting via the wireless communication interface to the first RAN a second-RAN registration request message for forwarding by the first RAN to the second RAN, and
wherein registering the device with the second RAN in response to registering the device with the call server comprises registering by the device with the second RAN in response to the indicating of successful registration of the device with the call server.

17. The device of claim 16, wherein the call server is an Internet Protocol (IP) Multimedia Subsystem (IMS), and wherein registering with the call server comprises engaging in Session Initiation Protocol (SIP) registration with the call server.

18. The device of claim 16,
wherein the controller is further configured to, after the device begins to engage, via the first RAN, in a call served by the call server, engage in a handover from the device engaging in the call via the first RAN to the device engaging in the call via the second RAN,
wherein the registering by the device with the second RAN before beginning to engage in the call helps to avoid a need for the device to register with the second RAN at a time of the handover and thereby helps to expedite the handover.

19. The device of claim 18, wherein the second-RAN registration request message carries data usable by the second RAN for registering the UE to be served by the second RAN.

20. The device of claim 19,
wherein the registration response message carries a specification of an anchor point of the call server, and
wherein the controller is further configured to include in the signaling second-RAN registration request message that the device transmits to the first RAN for forwarding to the second RAN the specification of the anchor point of the call server, for later use of the anchor point in processing the handover.

* * * * *